(12) United States Patent
Muscarella (10) Patent No.: US 6,796,273 B2
(45) Date of Patent: Sep. 28, 2004

(54) SWITCHING CURRENT WATER DIRECTOR (SCWD) FOR AQUARIUMS

(76) Inventor: Paul Michael Muscarella, 5560 Shady Creek La., Yorba Linda, CA (US) 92887

( * ) Notice: Subject to any disclaimer, the term of this patent is extended or adjusted under 35 U.S.C. 154(b) by 0 days.

(21) Appl. No.: 10/165,555

(22) Filed: Jun. 8, 2002

(65) Prior Publication Data
US 2003/0226517 A1 Dec. 11, 2003

(51) Int. Cl.$^7$ .............................. A01K 63/04; F17D 3/00
(52) U.S. Cl. .................. 119/263; 119/245; 137/624.14; 137/624.18; 137/625.11; 239/23; 239/99; 239/101; 239/240; 239/246; 239/570; 239/569; 239/225; 239/231; 239/232; 239/237; 239/380; 239/381; 4/491; 415/202
(58) Field of Search ................................ 119/245, 263, 119/255, 261; 4/491; 137/625.11, 624.18, 624.14; 415/202; 239/23, 99, 101, 240, 246, 570, 569, 225.1, 231, 232, 237, 380, 381

(56) References Cited

U.S. PATENT DOCUMENTS

| | | | |
|---|---|---|---|
| RE23,646 E | * | 4/1953 | Burdick |
| 2,741,265 A | | 4/1956 | Poor |
| 3,334,658 A | | 8/1967 | Kaatz |
| 3,405,733 A | * | 10/1968 | Hansen |
| 3,463,193 A | * | 8/1969 | Yost |
| 3,498,326 A | * | 3/1970 | Snyder |
| 3,508,582 A | | 4/1970 | Aulisa |
| 3,730,208 A | * | 5/1973 | Lewis ......................... 137/119 |
| 3,837,360 A | | 9/1974 | Buduta |
| 4,077,424 A | * | 3/1978 | Ehret et al. .................. 137/119 |
| 4,224,958 A | | 9/1980 | Kaplan |
| 4,229,969 A | | 10/1980 | Hark |
| 4,867,379 A | * | 9/1989 | Hunter ........................ 239/240 |
| 5,226,599 A | * | 7/1993 | Lindermeir et al. ........ 239/205 |
| 5,285,536 A | | 2/1994 | Long |
| 5,366,618 A | | 11/1994 | Foster |
| 5,467,739 A | | 11/1995 | Boschert |
| 5,732,657 A | | 3/1998 | Idbeis |
| 5,738,137 A | | 4/1998 | Reinke |
| 5,782,204 A | * | 7/1998 | Rahn ........................... 119/255 |
| 6,041,740 A | * | 3/2000 | Newman ..................... 119/261 |
| 6,321,683 B1 | * | 11/2001 | Schleinkofer ............... 119/245 |
| 6,488,401 B1 | | 12/2002 | Seaman |

FOREIGN PATENT DOCUMENTS

| | | | | |
|---|---|---|---|---|
| JP | 405123080 A | * | 5/1991 | .......... A01K/63/04 |
| JP | 405276850 A | * | 10/1993 | .......... A01K/63/04 |

* cited by examiner

Primary Examiner—Peter M. Poon
Assistant Examiner—Andrea M. Valenti
(74) Attorney, Agent, or Firm—Myers Dawes Andras & Sherman LLP; Vic Y. Lin (57) ABSTRACT

The present invention relates to a water director for distributing a surge or flow of water to one or more of a plurality of output ports, which can vary in shape, size, and number, typically for use in marine and fresh water aquariums. Water pumped through a conduit into the hermetically sealed Switching Current Water Director (SCWD), powers an internally mounted gear driven fluid motor, which turns a rotational valve, alternately opening and closing a plurality of water outlet ports. When mounted externally to an aquarium, proper placement of output nozzles, which are connected to a water conduit attached to the various SCWD outlet ports, provides the desired opposing, or switching back and fourth currents. Depending on the inlet and outlet port configuration, the SCWD can be adapted to suit many applications.

20 Claims, 10 Drawing Sheets

SWITCHING CURRENT WATER DIRECTOR (SCWD) FOR AQUARIUMS

CROSS REFERENCES TO RELATED APPLICATIONS

Water Current Switching Mechanism Improvement/Related Application:

The invention of this application is related to the invention of the application Ser. No. (Disclosure Document NO. 471430), filed 2000 Mar. 28.

Revolving Water Output Mechanism Improvement/Related Application:

The invention of this application is related to the invention of the application Ser. No. (Disclosure Document NO. 471431), filed 2000 Mar. 28.

BACKGROUND—FIELD OF INVENTION

The present invention relates to aquaria and an improved method for directing a surge or flow of water through one or more of a plurality of output ports whereby attempting to replicate the surges and switching currents found in the ocean. The device was specifically developed for marine and reef aquaria, which are those environments that sustain sensitive marine invertebrates such as corals and anemones. In addition to providing a more aesthetically pleasing visual display by simulating the natural appearance of ocean currents and surges, these same movements of water are critical to the health and proper growth stimulation of marine invertebrates and other life.

BACKGROUND—DESCRIPTION OF PRIOR ART

The desire to provide aquarists with a method or device in which to replicate the currents and surges that are found in the world's oceans is by no means a new concept. Others have developed various methods and or devices to address this specific need. Several aquarium wave makers are currently available to the aquarist. Most of these devices are electrically powered and are designed to operate small submersible water pumps, or powerheads that are physically placed in the aquarium. The individual water pumps are costly, consume electricity, and during operation can be noisy and add additional unwanted heat to the aquarium water. Additionally, in order to achieve the simulated wave or switching current effect, two or more unsightly pumps must be placed into a display setting in which you are trying to simulate a natural looking environment.

Heretofore many other devices or systems have been devised for creating surges or currents within an aquarium, but each one has one or more significant drawbacks, which will become obvious.

Poor, U.S. Pat. No. 2,741,265 (1956), identifies a fluid control distribution unit having two plates. One plate has a plurality of apertures; the other arcuate grooves. The rotation of one plate with respect to the other sequentially opens and closes coupling of the apertures to the grooves by causing them to align or misalign.

Kaatz, in U.S. Pat. No. 3,334,658 (1967), discloses a selector valve for fluid distribution. The valve has a common inlet port and a plurality of selectable outlet ports. The outlet ports have check valves which are spring biased closed and are openable by rotating a manual operator having protrusions which engage a selected one of the check valves to couple the outlet port to the inlet, allowing the user to manually select which outlet port is connected to the inlet port.

Yost, in U.S. Pat. No. 3,463,193 (1969), discloses a slide valve operable to open and close an opening in a casing wall.

Aulisa, in U.S. Pat. No. 3,508,582 (1970), identifies a selective coupling apparatus in which a rotor inside a casing couples a plurality of inlets to a single outlet.

Budula, in U.S. Pat. No. 3,837,360 (1974), discloses a fluid selector valve having a rotatable plate disposed in a chamber, a first port and a plurality of additional ports. The additional ports are selectively operable by manually rotating the plate through a controlled means extending externally through the housing.

Yet another invention, Kaplan, in U.S. Pat. No. 4,224,958 (1980), describes a valve having inner and outer plates having communicating openings and a middle plate rotatable to selectively open or close the openings.

Hark, in U.S. Pat. No. 4,229,969 (1980), provides for another such invention in which a displacer within a tank has forward and backward movement in which liquid escapes around the side of the displacer and the wall of the tank.

Long, in U.S. Pat. No. 5,285,536 (1994), describes a wave generating system utilizing a rotary sleeve valve particularly adapted to high volumetric, relatively low back pressure applications, and more particularly rotary sleeve valve for use in generating systems for water park wave pools. This application is obviously not well suited for use in aquariums.

U.S. Pat. No. 5,366,618 to Foster (1994), shows a water distributor for distributing water to numerous output ports. The particular output port(s) chosen varies as a function of time and depends on the position of a motor driven rotor within the distributor. The rotation of the distributor is accomplished through an electrical motor, whereby consuming electricity.

Boschert, in U.S. Pat. No. 5,467,739 (1994), addresses a pump, transferring water from the main display aquarium into a top container and an overflow container, which are inserted into the aquarium, lowering the water level within the aquarium and thereby creating the affect of a tide pool.

Idbeis, in U.S. Pat. No. 5,732,657 (1996), Identifies a sea current generator aquarium which includes an air tight water chamber located at one end of the aquarium with a first opening into the aquarium extending across the bottom of the chamber. An air pump is used to constantly pump air into the water chamber and expel water out of the first opening into the aquarium. An air pump must be used to constantly pump air into the water chamber and expel water out of the first opening into the aquarium, again using electricity to energize the air pump.

Reinke, in U.S. Pat. No. 5,738,137 (1998), shows an apparatus for creating surges using a pump to move water from the display aquarium to a separate external tank. This approach requires two separate tanks to accommodate the device in which to acquire the wave-like motions.

Rahn, in U.S. Pat. No. 5,782,204 (1998), replicates the wave-like surges by using a water pump powered shuttle valve mechanism to move a plunger between two outlet ports to alternately open and close them to get the desired opposing surges. The device appears to be quite complex to manufacture and cost prohibitive to the average aquarium owner. In two other alternate objects of the invention using an electronic timer to operate the shuttle valve through a solenoid or an AC gear motor again both requiring the need for additional electricity.

OBJECTS AND ADVANTAGES

Accordingly, several objects and advantages of this invention are to provide a highly efficient, reliable, cost effective aquarium water surge generator which obviates the disadvantages of prior surge generators, specifically which is compact in size, enabling it to be used in small or large applications, which is hermetically sealed, enabling mounting either externally or internally to the aquarium depending on the desired effect, which eliminates unsightly powerheads and pumps inside the aquarium, which can be made economically and simply, which can be installed easily to accommodate existing aquarium set-ups, which is silent in operation and maintenance free, and which does not require electricity.

A further object of this invention is to provide a device in which ocean-like surges and currents are replicated within an aquarium.

A further object of this invention is to provide a means to replicate the ocean's surges and currents within an aquarium without the need for additional electrical power.

A further object of this invention is to provide an aquarium water surge generator with varying output port sizes, shapes and numbers, which allows installation inside the aquarium to produce improved circulation and water currents.

Further objects and advantages will become apparent from a consideration of the ensuing description and accompanying drawings.

Still further objects and advantages will become apparent from a consideration of the ensuing description and accompanying drawings.

REFERENCE NUMERALS 10 switching current water director (SCWD)
12 water inlet
14 left outlet port
15 right outlet port
16 aquarium
18 fluid conduit
18A fluid conduit
20 water pump outlet
22 output nozzles
24 water director housing
26 gear driven fluid motor
27 impeller
28 spindle
29 planetary gears
30 revolving slide valve
31 gear driven fluid motor housing
32 pump
34 housing stand-offs
36 flow diverter
38 diverter flap
40 diverter shaft
42 diverter adjustment knob

SUMMARY

In keeping with these objectives and others that may become apparent, a switching current water director comprising: a hermetically sealed cylindrical housing with an inlet located at one end and a plurality of outlets located at the other end, an internally mounted fluid motor to provide rotational energy, a rotating valve attached to the fluid motor for opening and closing the outlets.

During use, water flowing through the fluid motor impeller activates an internal gear train in which rotational energy is transferred to the spindle exiting the top of the fluid motor housing, which is attached to the revolving slide valve.

The revolving slide valve, which rotates along the inner wall of the switching current water director housing at varying durations, based on water pressure, volume, and size of the rotating valve, opens and closes the various outlet as it completes each revolution. By adjusting the water flow to the fluid driven gear drive motor either through external means, such as a valve, or internal flow diverter built into the switching current water director, the switching speed may be increased or reduced to accommodate many applications.

The switching current water director for providing pressurized water flow in varying directions at varying intervals within an aquarium. During use a rotating valve controls water output by opening and closing outlets that can vary in size, shape, and number.

Preferably, two water outlets, which are connected to water conduit with outlet nozzles placed at opposite ends of the aquarium, provide the alternating, or back and fourth currents within the aquarium.

Water pumped through a fluid conduit, either hard line PVC pipe or vinyl hose, to the Switching Current Water Director (SCWD), powers an internally mounted gear driven fluid motor, which in turn activates a revolving slide valve, which alternately opens and closes a plurality of water outlet ports. By proper placement of output nozzles, which are connected to a water conduit attached to the various SCWD outlet ports, the desired opposing or switching back and fourth currents is obtained. Depending on the inlet and outlet port configuration, the water directors can be adapted to suit many applications, and can be mounted either internally or externally to the aquarium, depending on individual circulation needs. This particular invention eliminates the need for additional water pumps, which require electricity, since existing marine aquariums will already have a pump, canister filter, or powerhead as part of the general filtration and circulation system. The device can be used in unlimited sizes and configurations to accommodate many applications.

Preferred Embodiment—Description

Figure 1:
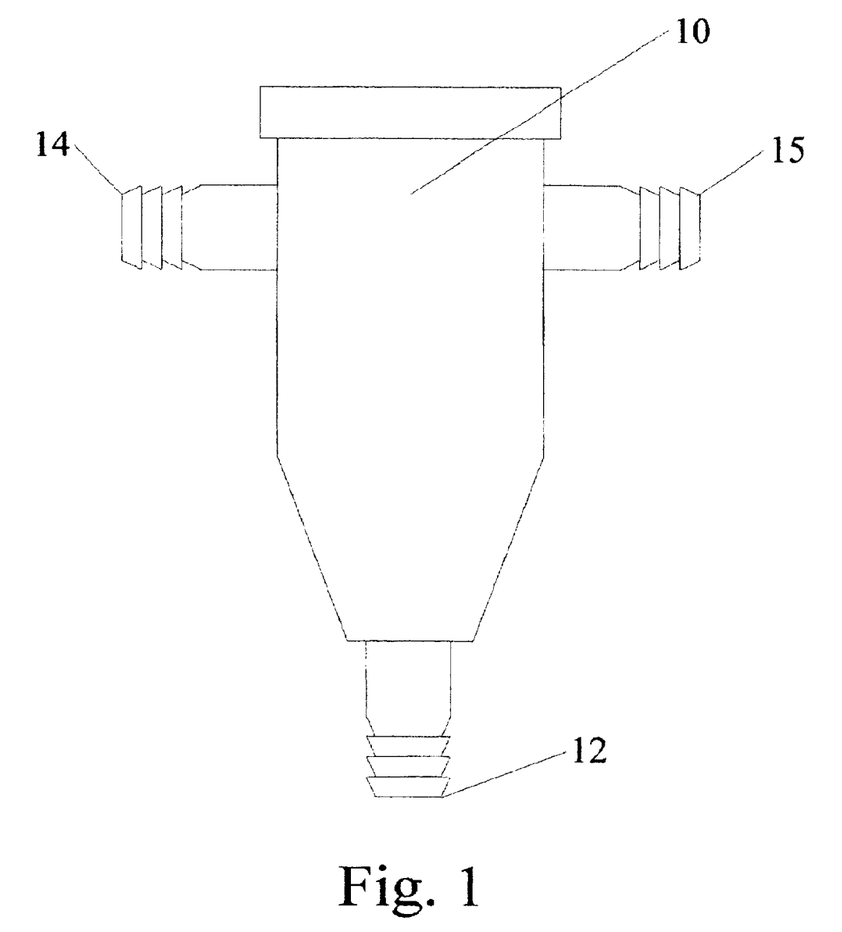
FIG. 1 is a perspective view of my invention, switching current water director (SCWD).

In accordance with the invention, FIG. 1 depicts a standard configuration switching current water director (SCWD) 10 with a water inlet 12 and two outlet ports 14 & 15.

Figure 2:
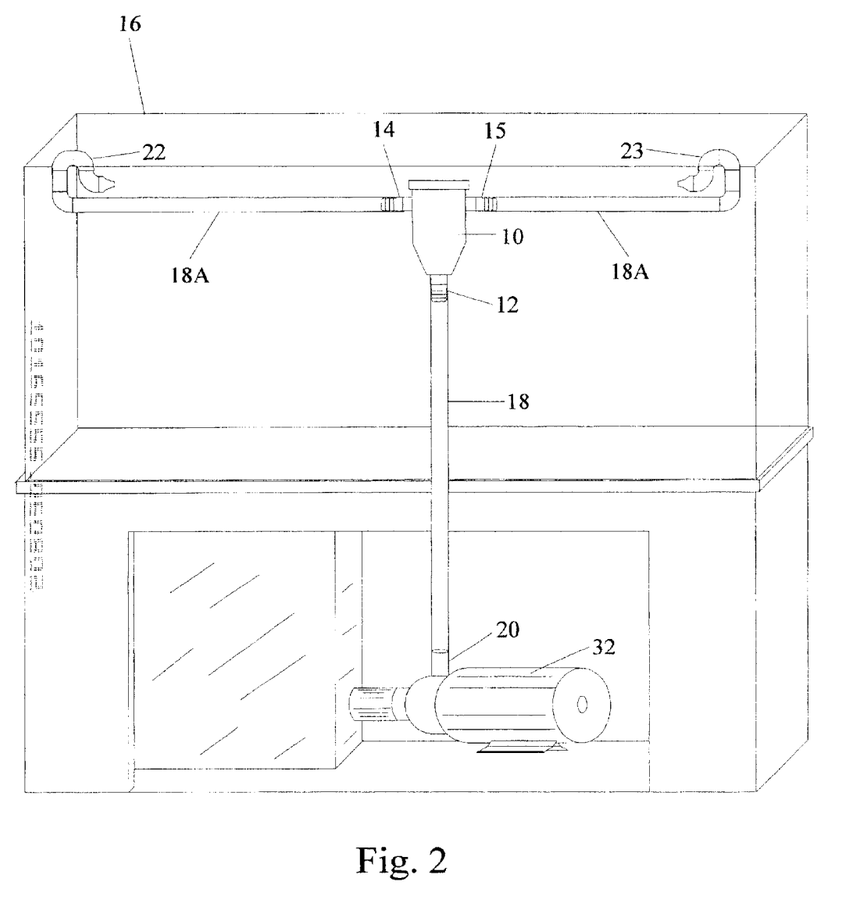
FIG. 2 is an isometric view of the preferred installation of the switching current water director mounted externally on an aquarium.

FIG. 2 depicts a switching current water director (SCWD) 10 mounted externally on an aquarium 16. The SCWD water inlet 12 is connected via fluid conduit 18, vinyl hose or other means, to a water pump outlet 20. The switching current water director left and right outlet ports 14 & 15 are connected via fluid conduit 18, vinyl hose or other means to two opposing output nozzles 22, which are placed inside the aquarium 16 at opposite ends, directed toward each other.

Figure 3:
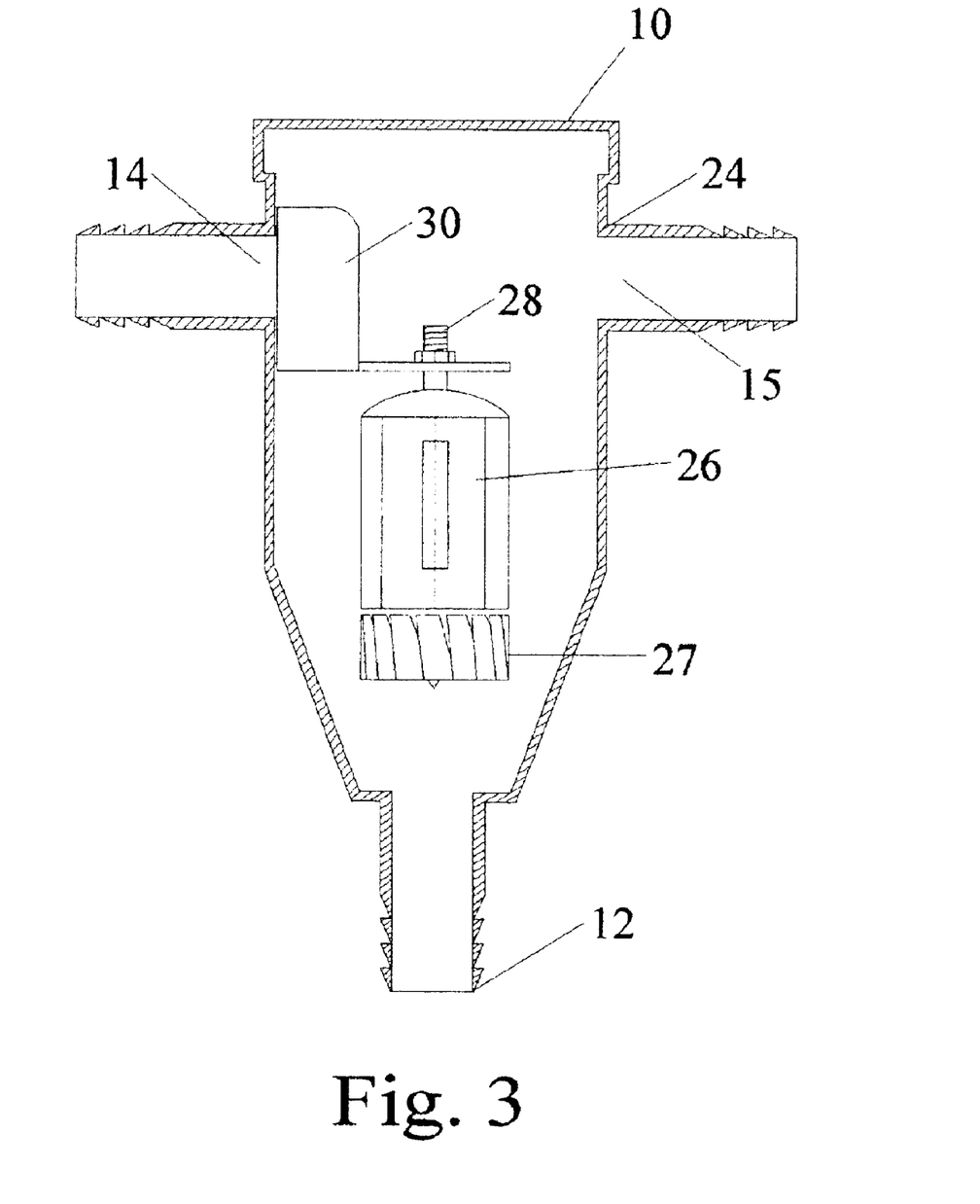
FIG. 3 is an internal view of the switching current water director showing the right outlet open.

FIG. 3 shows the internal mechanism of the switching current water director 10 wherein the water director housing 24 is shown in cross section. Internally mounted to the housing stand-offs 34 is a gear driven fluid motor 26. The spindle 28 of the gear driven fluid motor 26 is attached to a revolving slide valve 30, which is shown closing the left outlet port 14, leaving the right outlet port 15 open.

Figure 4:
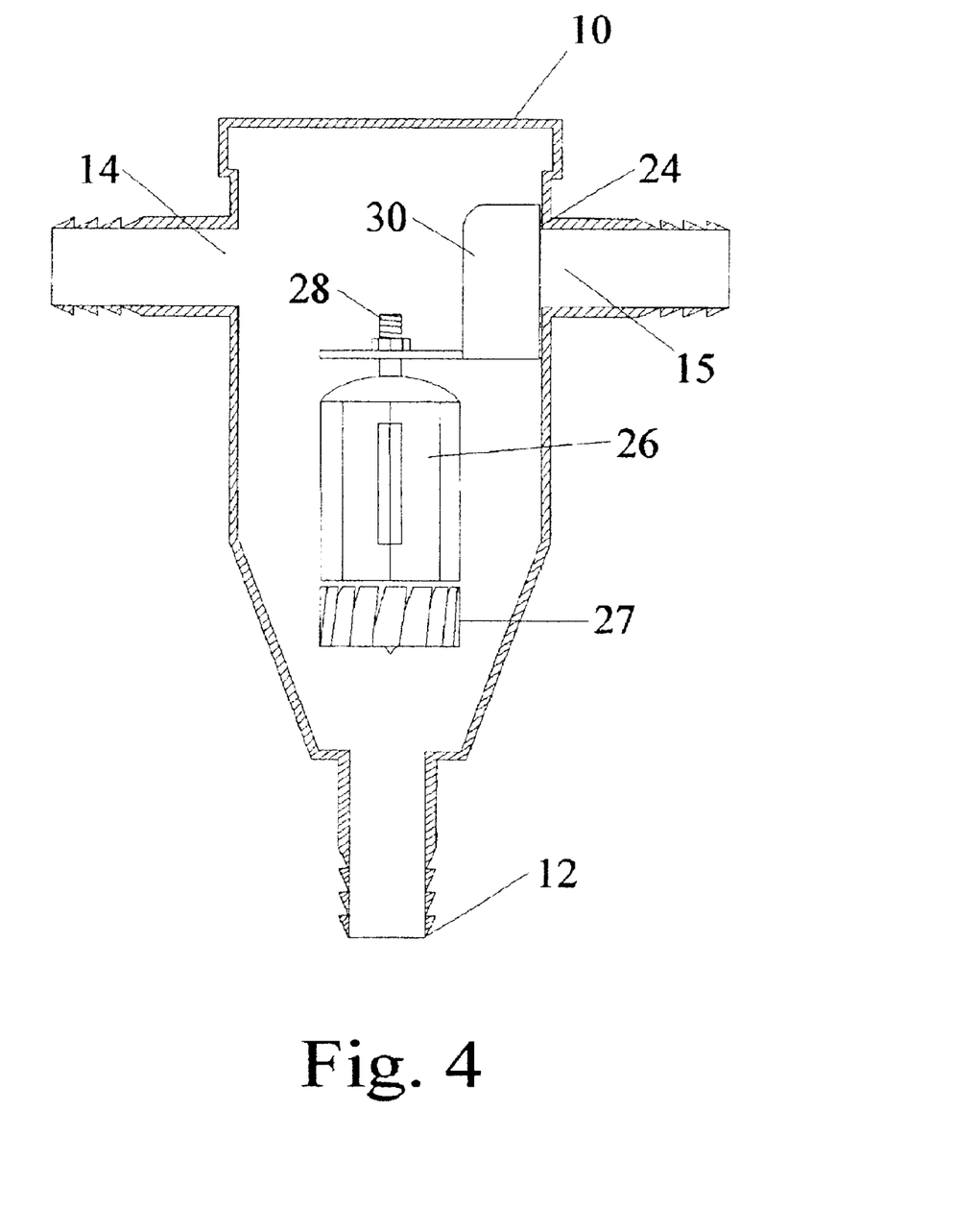
FIG. 4 is an internal view of the switching current water director showing the left outlet open.

FIG. 4 shows the internal mechanism of the switching current water director 10 wherein the water director housing 24 is shown in cross section as in FIG. 3. This particular diagram shows the revolving slide valve 30 closing the right outlet port 15, leaving the left outlet port 14 opened.

Figure 5:
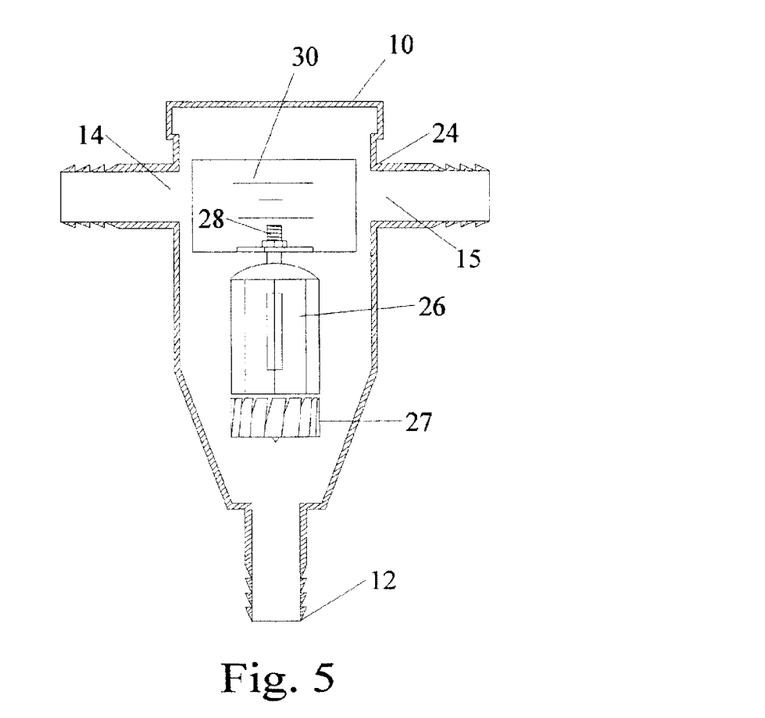
FIG. 5 is an internal view of the switching current water director showing the revolving slide valve in the center position with both output ports open.

FIG. 5 shows the internal mechanism of the switching current water director 10 wherein the water director housing 24 is shown in cross section as in FIG. 3. Here the revolving slide valve 30 is between outlet ports 14 & 15 leaving both outlet ports open.

Figure 6:
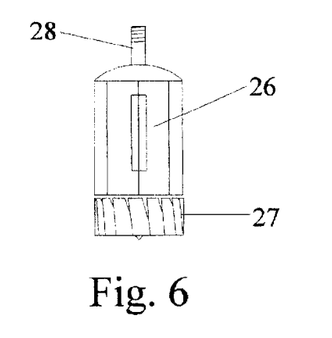
FIG. 6 is a perspective view of a gear driven fluid motor

FIG. 6 is a perspective view of a gear driven fluid motor 26 wherein the impeller 27 is connected to internal gearing, which is attached to the spindle 28.

Figure 7A:
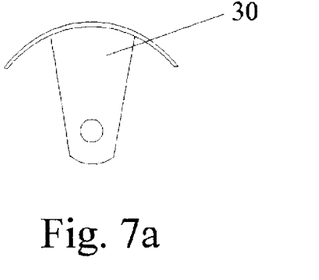
FIG. 7a is a top view of the revolving slide valve
Figure 7B:
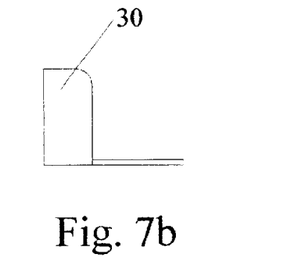
FIG. 7b is a side view of the revolving slide valve

FIGS. 7a, 7b shows a top and side view of the revolving slide valve 30.

Figure 8:
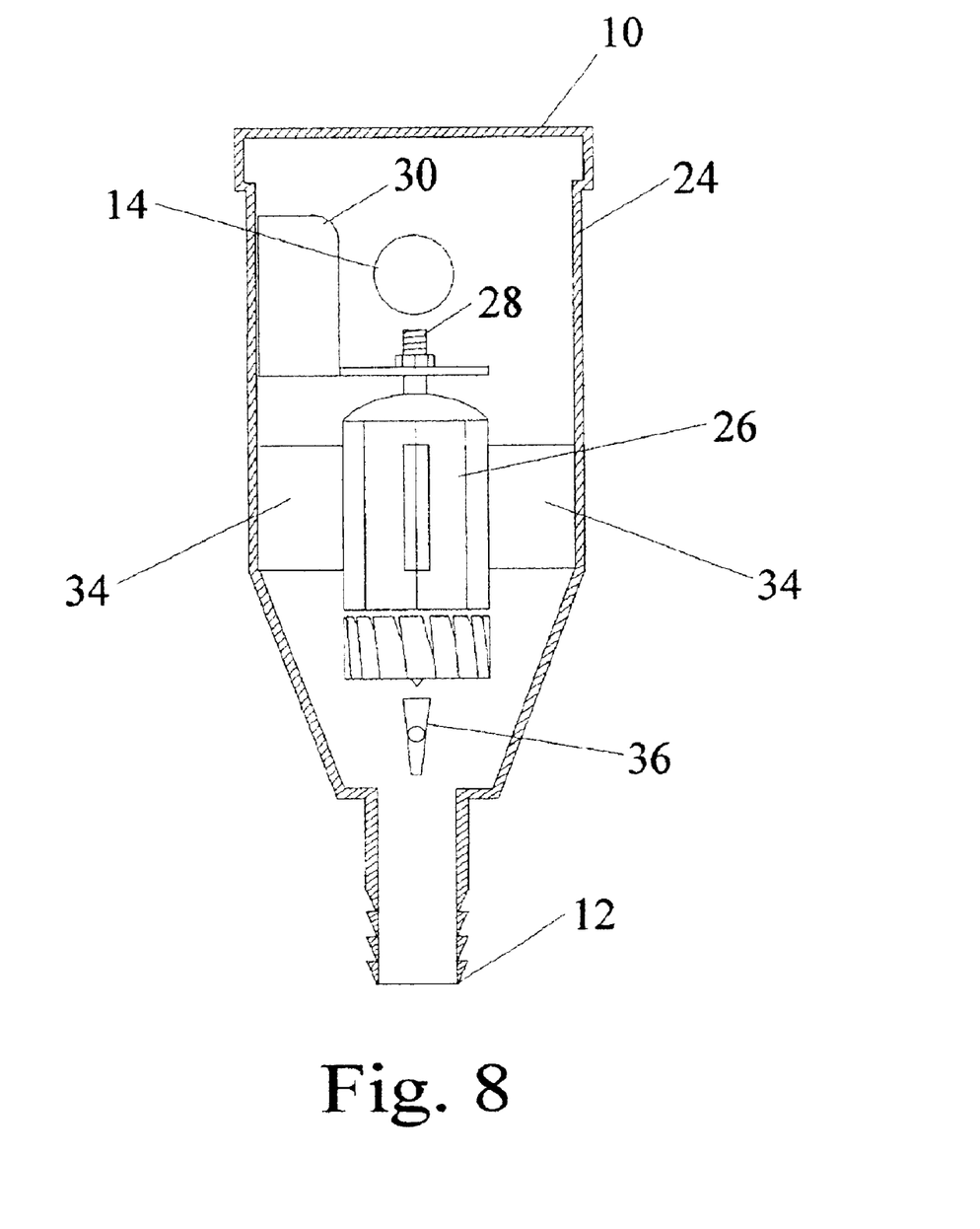
FIG. 8 is an internal view of the switching current water director depicting the flow diverter in the opened position.

FIG. 8 shows the internal mechanism of the switching current water director 10 wherein the water director housing 24 is shown in cross section. This particular diagram shows a side view of an internally mounted flow diverter 36 in the fully opened position.

Figure 9:
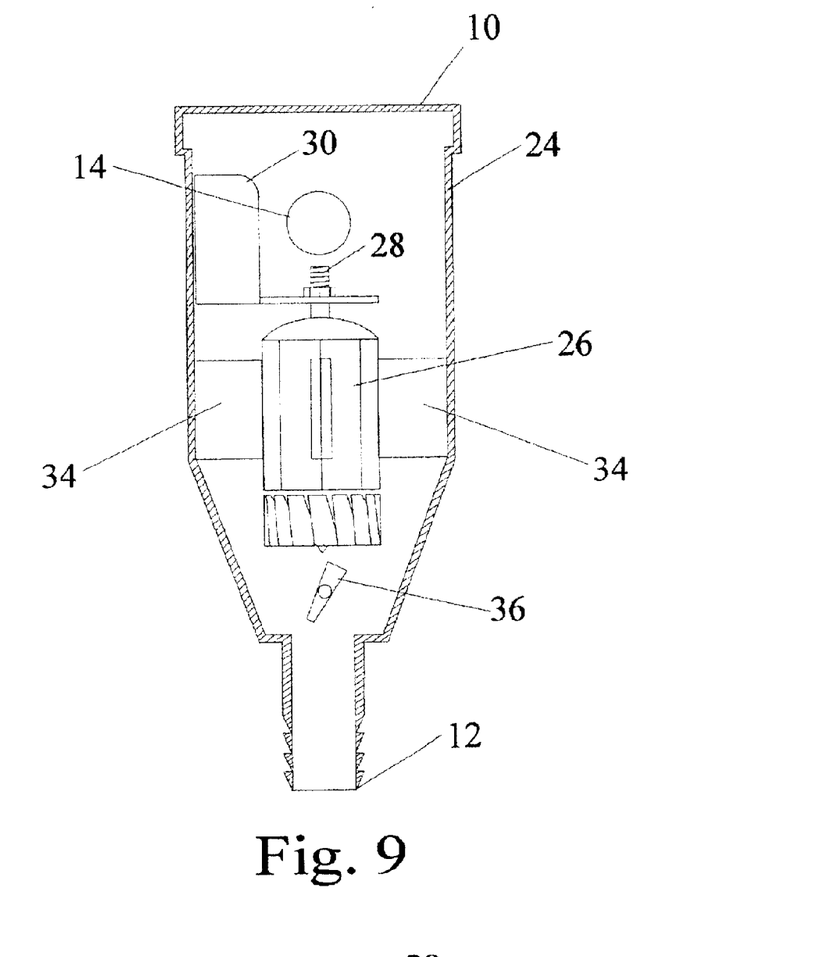
FIG. 9 is an internal view of the switching current water director depicting the flow diverter in a partially closed position.

FIG. 9 shows the internal mechanism of the switching current water director 10 wherein the water director housing 24 is shown in cross section as in FIG. 8. This particular diagram shows a side view of an internally mounted flow diverter 36 in a semi-closed position.

Figure 10:
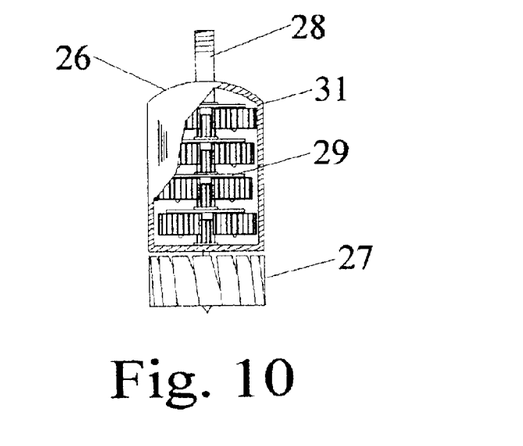
FIG. 10 is an internal view of the gear driven fluid motor.

FIG. 10 is a cut away view of the gear driven fluid motor 26 wherein the impeller 27 is attached to a set of planetary gears 29, which are connected to the spindle 28, which exits the top of the gear driven fluid motor housing 31.

Figure 11:
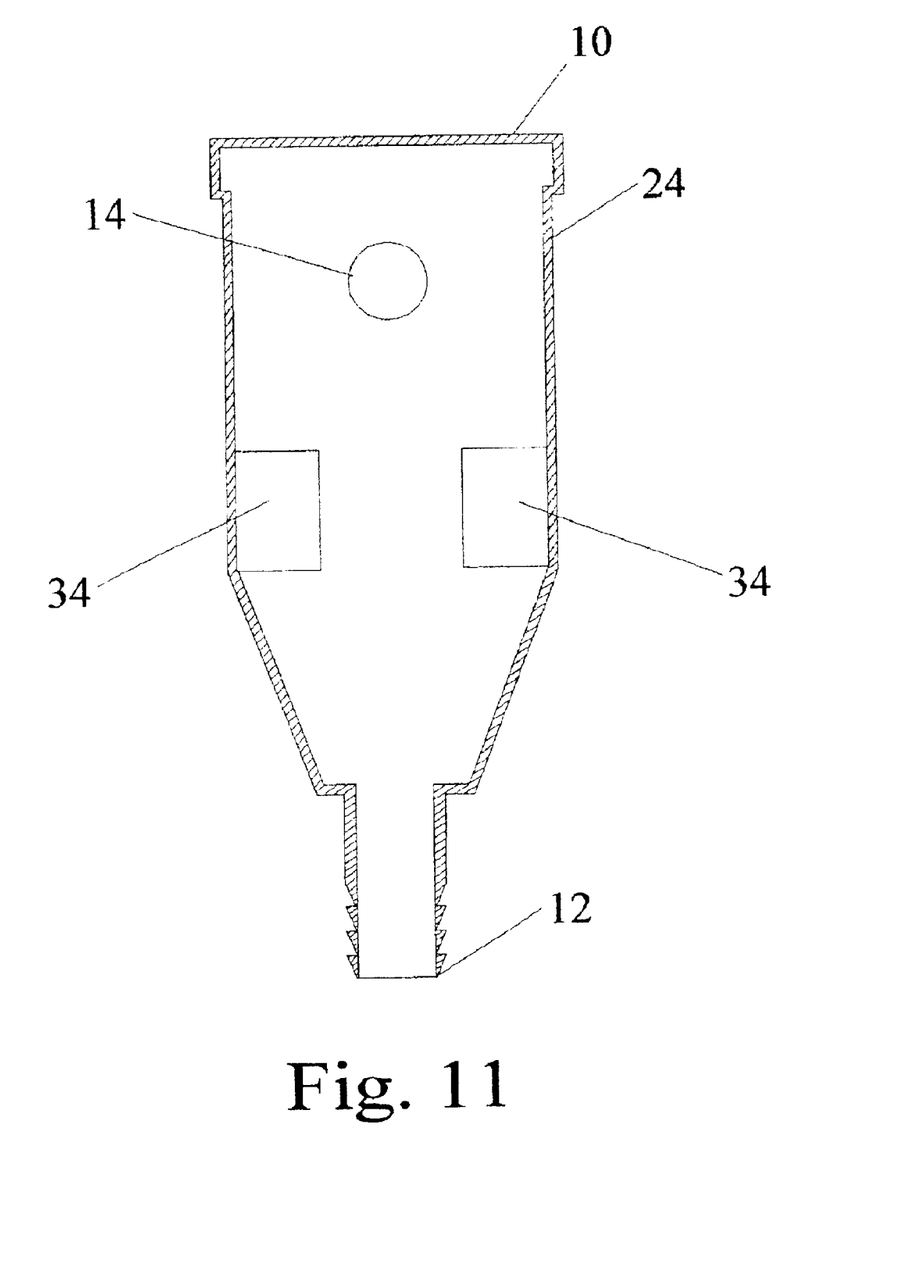
FIG. 11 is an internal view of the switching current water director showing the housing stand-offs used to mount the gear driven fluid motor.

FIG. 11 is a cross section view of the water director housing 24 showing the housing stand-offs 34 used to mount the gear driven fluid motor 26.

Figure 12:
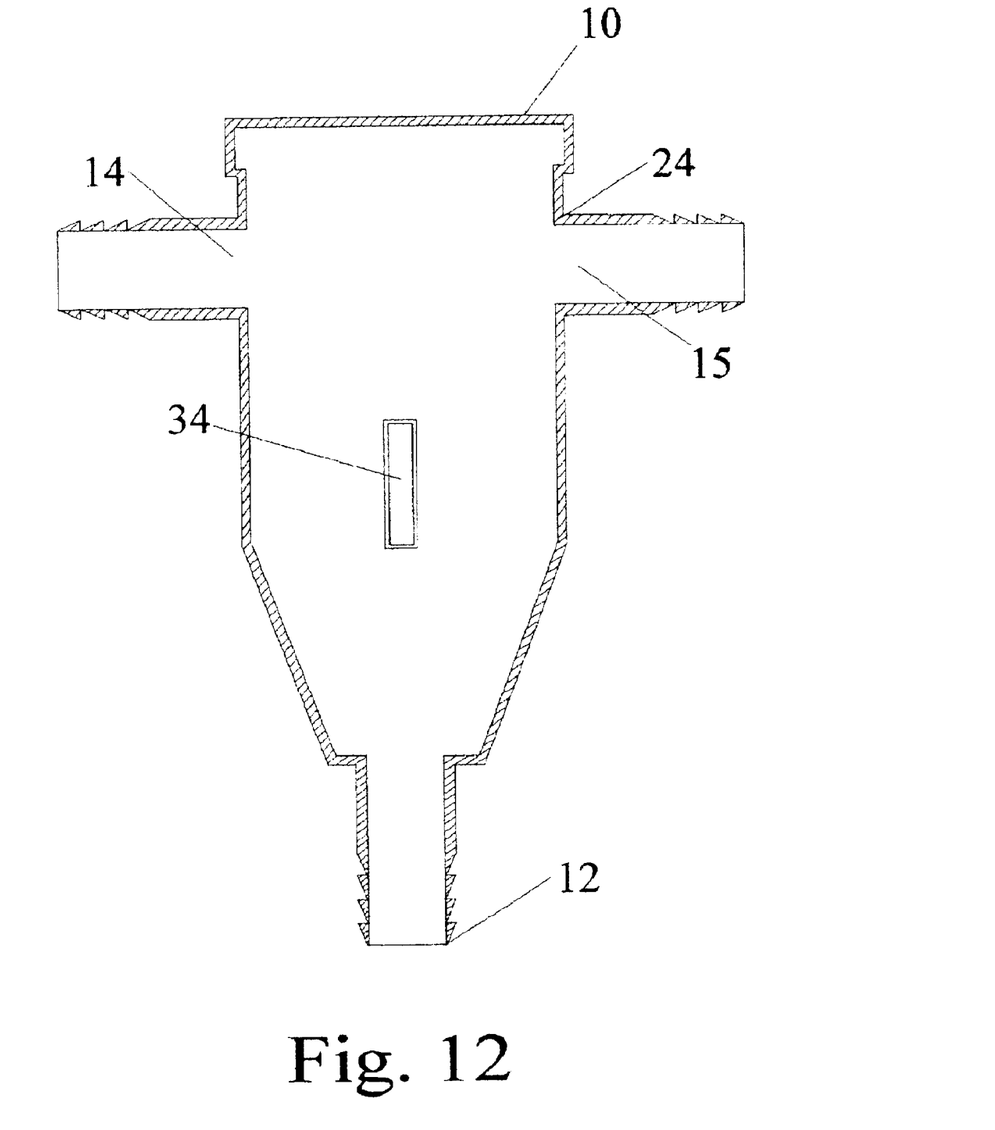
FIG. 12 is an internal view of the rear side of the switching current water director showing the standoff used to mount the gear driven fluid motor.

FIG. 12 is a cross section view of the rear side of the water director housing 24 showing a front view of a housing stand-off 34 used to mount the gear driven fluid motor.

Figure 13:
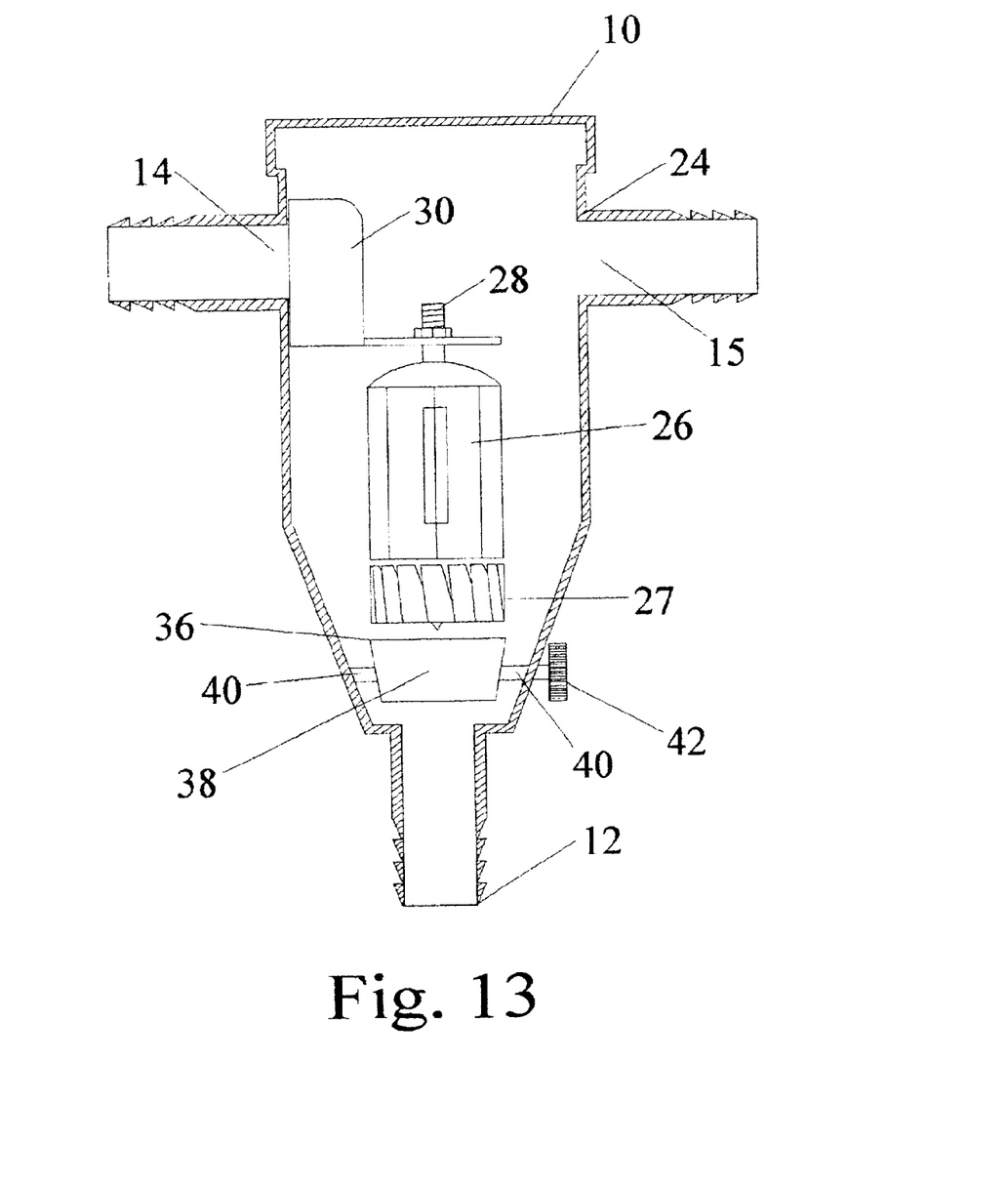
FIG. 13 is a perspective view of the optional flow diverter mounted internally to the switching current water director.

FIG. 13 is a perspective view of the optional flow diverter 36 mounted internally to the switching current water director 10, wherein the diverter flap 38 is attached on both sides to the diverter shaft 40. The diverter shaft 40 of the flow diverter 36 exits one side of the switching current water director housing which is attached to a diverter adjustment knob 42.

Preferred Embodiment—Operation

Operation of the Switching Current Water Director 10 is quite simple and straightforward. Pressurized water from a pump 32, canister filter, or powerhead is directed through a fluid conduit 18, such as vinyl tubing or PVC pipe to the SCWD inlet port 12. Water passes through the inlet port 12 and is directed to the internally mounted gear driven fluid motor 26. Water is forced passed the flow diverter 36 through the impeller 27 of the gear driven fluid motor 26 causing a transmission of power through an attached set of planetary gears 29 to a spindle 28 that exits the top of the gear driven fluid motor housing 31. The spindle 28 is attached to a revolving slide valve 30 which in turn rotates at a predetermined speed, depending on the gearing of the gear driven fluid motor 26 and volume of water flowing through the Switching Current Water Director 10, to alternately open and close the output ports 14, 15. As the revolving slide valve 30 rotates, water is alternately expelled through outlet ports 14, 15 and transferred through the fluid conduit 18A, such as vinyl hose or other means, to the attached output nozzles 22 which are placed in the aquarium 16 at opposing ends, creating the much desired switching currents.

Conclusions, Ramifications, and Scope

Conclusions

Switching Current Water Director (SCWD) Patent:

Accordingly it is seen that, according to the invention, a device is provided to reproduce the desired affect of ocean currents for use in aquariums, yet in an economical, reliable, easy to fabricate, and highly durable manner. As stated, the present invention relates to a water director for distributing a surge or switching flow of water to one or more of a plurality of output ports, which may vary in size, shape, and number. Typically for use in marine and fresh water aquariums and specifically developed for marine aquaria and those environments that sustain marine invertebrates such as corals and anemones. In addition to providing a more aesthetically pleasing visual display by replicating the natural appearance of ocean surges and currents, these same surges of water are critical to the health and proper growth stimulation of marine invertebrates and other marine life.

Water pumped through a fluid conduit, such as hard line PVC pipe or vinyl hose, to the Switching Current Water Director (SCWD), powers an internally mounted gear driven fluid motor, which in turn activates a revolving slide valve, which during each revolution alternately opens and closes a plurality of water outlet ports. By proper placement of output nozzles, which are connected to a water conduit attached to the various SCWD outlet ports, the desired opposing or switching back and fourth currents is obtained. Depending on the inlet and outlet port configuration, the water switching current water director can be adapted to suit many applications and can be mounted either internally or externally to the aquarium, depending on individual circulation needs. This particular invention eliminates the need for additional water pumps, since existing marine aquariums will already have a pump, canister filter, or powerhead as part of the general filtration and circulation system. The device can be used in unlimited sizes and configurations to accommodate many applications.

Ramifications

While the above description contains many specificities, these should not be construed as limitations on the scope of the invention, but as exemplifications of the presently preferred embodiments thereof. Many other ramifications and variations are possible within the teachings of the invention. For example, the device can be used for irrigation purposes by shunting water between multiple locations at a predetermined frequency. Another possible application for this device is for use in decorative water fountains. Yet another application for this device is for use in forced water systems used for decorative water displays, which force pressurized water through multiple holes in the ground at varying frequencies to provide a random geyser affect. Thus the scope of the invention should be determined by the appended claims and their legal equivalents, and not by the examples given.

What is claimed is:

1. An aquarium fluid shunting device, comprising:
   a hermetically sealed cylindrical housing having an inlet and a plurality of outlets enabling said housing to distribute recirculated fluid in multiple directions;

a gear drive assembly mounted in said cylindrical housing for producing rotational energy, the gear drive assembly comprising gears and an impeller;

a motor housing substantially enclosing the gears to substantially prevent debris in the recirculated fluid entering the inlet from directly contacting the gears, the impeller being disposed external to the motor housing; and a revolving slide valve mounted to said gear drive assembly and configured to rotationally open and close said outlets in order to shunt water to various said outlets that discharge to an aquarium.

2. The device of claim 1 wherein the revolving slide valve comprises a vertical face.

3. The device of claim 1, wherein a switching current water director is mounted externally to an aquarium for providing a means of directing and dispersing water flow within an aquarium in varying directions and at varying intervals comprising:

a director means having a water tight housing comprised of a main water inlet port, a plurality of water outlet ports, a means for rotational energy, and a means for opening and closing said outlet ports;

a pump means to provide water to said inlet;

a conduit means to provide transfer of water to said inlet port and from said outlet ports to varying locations of the aquarium.

4. The device of claim 3, wherein the switching current water director is mounted internally to the aquarium for providing a means of directing and dispersing water flow to varying directions and at varying intervals within an aquarium comprising:

a director means having a water tight housing comprised of a main inlet port, a plurality of outlet ports, a means for rotational energy, and a means for opening and closing said outlet ports;

a pump means to provide water to said inlet;

a conduit means to provide transfer of water to said inlet port and from said outlet ports to varying locations within the aquarium.

5. The device of claim 1, wherein said inlet provides a means to direct water to power said rotational gear drive assembly;

said gear drive assembly provides a means for rotational energy; and said revolving sliding valve provides a means for selection and duration of opening and closing of said outlet ports.

6. The device of claim 1 wherein said housing outlet ports may vary in number, shape and size.

7. The device of claim 1 wherein said revolving slide valve may vary in number, shape and size.

8. The device in claim 1 wherein rotational speed of said gear drive assembly may be reduced or increased by adjusting gear ratios.

9. The device of claim 1 wherein rotational speed of said revolving slide valve is adjusted through regulation of water flow to said gear drive assembly by a water diverter mounted internally in said cylindrical housing and disposed externally to the motor housing.

10. The device of claim 1, wherein at least one of said plurality of outlets is open at all times.

11. The device of claim 1, wherein:

said hermetically sealed cylindrical housing comprises a cylindrical inner surface; and said slide valve is configured to rotate with a distance spaced apart from said cylindrical inner surface.

12. The device of claim 11, wherein:

said distance comprises a range between 0.005 inch to 0.095 inch.

13. An aquarium wave generating device, comprising;

a hermetically sealed cylindrical housing having an inlet and a plurality of radial outlets enabling said housing to distribute recirculated fluid in multiple directions;

a gear drive assembly mounted in said cylindrical housing, said gear drive assembly being adapted to produce rotational energy by a flow of said recirculated fluid, said gear drive assembly comprising gears and an impeller;

a motor housing substantially enclosing said gears to prevent debris in said recirculated fluid from entering said motor housing, said impeller being disposed externally to said motor housing; and a rotating slide valve driven by said gear drive assembly to rotate so as to open and close said radial outlets that discharge to an aquarium.

14. The device of claim 13, wherein at least one of said plurality of outlets is open at all times.

15. The device of claim 13, wherein:

said hermetically sealed cylindrical housing comprises a cylindrical inner surface; and said slide valve is configured to rotate with a distance spaced apart from said cylindrical inner surface.

16. The device of claim 15, wherein:

said distance comprises a range between 0.005 inch to 0.095 inch.

17. A method for generating waves in an aquarium, comprising:

recirculating water into a cylindrical housing having a first outlet and a second outlet;

driving a gear assembly in the cylindrical housing with the pumped water;

shielding gears of the gear assembly from direct contact with debris in the water with a motor housing;

rotating a revolving slide valve with the gear assembly to alternately close the first and second outlets; and alternately directing the water through the first and second outlets and into the aquarium to generate waves.

18. The method in claim 17, further comprising:

externally mounting the housing to the aquarium.

19. The method in claim 17, further comprising:

keeping at least one of said first and second outlets open at all times.

20. The method in claim 17, wherein the rotating step comprises:

rotating said valve with a distance spaced apart from an inner surface of said housing.

* * * * *